United States Patent [19]

Brandau

[11] 3,856,964

[45] Dec. 24, 1974

[54] CONCENTRATE FOR INFUSION PURPOSES CONTAINING 5,5-DIPHENYLHYDANTOIN SODIUM

[75] Inventor: Rainer Brandau, Hamburg, Germany

[73] Assignee: Desitin-Werk Carl Klinke GmbH, Alslerkrugchaussee, Hamburg, Germany

[22] Filed: Mar. 15, 1973

[21] Appl. No.: 341,596

[30] Foreign Application Priority Data
Mar. 18, 1972 Germany.............................. 2213275
Feb. 24, 1973 Germany.............................. 2309263

[52] U.S. Cl. .............................................. 424/273
[51] Int. Cl............................................ A61u 27/00
[58] Field of Search........................... 424/343, 273

[56] References Cited
OTHER PUBLICATIONS

Derevent Farindoc Abstracting, German 1,617,433 11-26-70.
Chem. Abst., 73, (1970), 38551a.

*Primary Examiner*—Stanley J. Friedman
*Attorney, Agent, or Firm*—Cushman, Darby & Cushman

[57] ABSTRACT

Sterilizable infusion concentrates of essentially unlimited stability which contain 5,5-diphenyl hydantoin sodium (DPH-Na) and can be diluted with standard aqueous infusion solutions in any desired ratio are obtained by dissolving DPH-Na in a solvent mixture comprising water and other physiologically acceptable organic solvents as well as 2-amino-2(hydroxymethyl)-propane-1,3-diol as solubilizer.

8 Claims, No Drawings

CONCENTRATE FOR INFUSION PURPOSES CONTAINING 5,5-DIPHENYLHYDANTOIN SODIUM

German Pat. No. 1,617,433 discloses a process for preparing sterilizable, essentially infinitely stable 5,5-diphenyl hydantoin sodium (DPH-Na) solutions for injection purposes, in which DPH-Na is dissolved in a solvent mixture containing water and 40 to 50 percent by volume of tetrahydrofurfuryl alcohol polyethylene glycol ether (tetraglycol) and in which part of the tetraglycol can optionally be replaced by ethanol. The addition of tetraglycol ensures an essentially unlimited stability of the aqueous solutions of DPH-Na, which in itself has a very low solubility in water. These solutions are suitable for injection purposes and are employed for the treatment of status epilepticus as well as cardial disorders such as irregularities of the heart rhythm.

For clinical practice it would be highly desirable if the DPH-Na injection solutions prepared according to the process of said prior patent could for infusion purposes be diluted with physiological mostly aqueous solutions.

This form of application would permit to supply to the body uniformly and slowly an exactly dosed amount of active component per time unit, while avoiding the passage through the gastro-intestinal tract. This would ensure the rapid formation of a therapeutic blood level as well as its maintenance during several hours or days and the hourly repetition of the injection would be avoided which is a nuisance for both the patient and the physician. Experiments to employ the tetraglycol-containing DPH-Na injection solutions for said purpose by diluting them with various standard infusion solutions proved, however, that no stable DPH-Na solutions for infusion purposes can be prepared by this method which is at first suggesting itself.

Furthermore, it has been tried to prepare an infusion concentrate which after dilution with standard infusion solutions remains stable for several hours and to achieve this by the addition of further alkali. However, the addition of strong alkali, e.g., alkali metal hydroxide, not only considerably impairs the physiological compatibility of the DPH-Na solutions but the solutions become readily turbid during the process of preparation, particularly when air is admitted.

It has now been found that an addition of 2-amino-2(hydroxymethyl)-propane-1,3-diol (tromethamol) as solubilizer to an aqueous/organic solvent system is sufficient to enable the preparation of an infusion concentrate which is dilutable for infusion purposes and stable even at sterilization temperatures of about 120°C, and the pH of which corresponds to that of the physiologically compatible injection solutions according to German Pat. No 1,617,433.

The subject of the invention accordingly is a sterilizable, practically infinitely stable infusion concentrate containing 5,5-diphenylhydantoin sodium, which can be mixed in any ratio with aqueous infusion solutions and which comprises as solvents water and other physiologically acceptable organic solvents, as well as 2-amino-2(hydroxymethyl)-propane-1,3-diol as solubilizer.

According to a preferred embodiment, the concentrate comprises tetrahydrofurfuryl alcohol polyethylene glycol ether (tetraglycol) or a mixture of tetraglycol and ethanol as other physiologically acceptable organic solvents. Preferably, the infusion concentrate comprises in this case, apart from water, 10 to 50, particularly 15 to 25 percent (by weight/volume), of tetraglycol and 35 to 5, particularly 20 to 12 percent (wt./vol.) of tromethamol.

According to a further, particularly preferred embodiment, the infusion concentrate comprises 20 to 50 percent, particularly 30 to 40 percent (wt./vol.), of propylene glycol and 10 to 2 percent, particularly 5 to 2 percent (wt./vol.) of tromethamol, while it is also possible to replace up to 30 percent by weight of the propylene glycol by another physiological alcohol, preferably ethanol.

After dilution with different standard infusion solutions, particularly with physiological electrolyte solutions, the infusion concentrate Yields clear solutions having a relatively low pH. The infusion solutions show no tendency towards crystallization during the infusion (the period of observation regarding the infusion was 8 days). It proves to be particularly advantageous in this respect that such a concentrate for infusion purposes can be diluted in a ratio of up to 1:20 but, on the other hand, in special cases can be applied also directly as concentrate by means of a perfusor.

The addition of tromethamol as solubilizer has, moreover, a therapeutic advantage; particularly with patients suffering from irregularities of heart rhythm there are often observed metabolic acidoses, which can be treated by the addition of tromethamol. Clinical practice has shown, however, that the relatively high concentration of organic base cannot be applied in all cases due to the increase of the blood pH accompanied therewith. In such cases the change of the blood pH will be smaller if the infusion concentrate has a lower tromethamol concentration which is possible when the solvent system water/propylene glycol or water/propylene glycol/ethanol is used.

If the high dilutability is to ensured also upon addition of acidic standard infusion solutions, then 0.1 to 0.2 percent (wt./vol.) of sodium hydroxide can be added to the infusion concentrate.

50 ml of infusion concentrate generally contain 750 mg. of DPH, corresponding to 815.4 mg. of DPH-Na. This amount is dissolved in a solvent mixture which, apart from water, comprises mainly 20 to 50 percent (wt./vol.) of propylene glycol and 5 -2 percent (wt./vol.) of tromethamol, and in which up to 30 percent by weight of propylene glycol can be replaced by ethanol. However, the solvent mixture may also comprise, apart from water, particularly 10 to 50 percent (wt./vol. of tetraglycol and 35 to 5 percent (wt./vol.) of tromethamol.

The invention will be illustrated in more detail by the following examples which describe the preparation of DPH-Na infusion concentrates according to the invention.

Example 1

815.4 mg. of 5,5-diphenyl hydantoin sodium were dissolved with gentle heating in a mixture of 8 g. of tetrahydrofurfuryl alcohol polyethylene glycol ether (tetraglycol) and 6 g. of 2-amino-2(hydroxymethyl)propane-1,3-diol (tromethamol) as well as 30 ml of water. The solution was filled up with water to 50 ml, filtered to remove germs, filled into ampuls and sterilized in the closed ampuls at 120°C for 20 minutes. After storage

Example 2

As stated in example 1, 815.4 mg. of 5,5-diphenyl hydantoin sodium were dissolved in a mixture of 12.5 g. of tetraglycol, 6 g of tromethamol and 30 ml of water. After having been filled up with water to 50 ml, the solution was treated further as in Example 1.

Example 3

As described in Example 1, 815.4 mg. of 5,5-diphenyl hydantoin sodium were dissolved in a mixture of 7.5 g of tetraglycol, 10 g of tromethamol and 30 ml of water and, after having been filled up to 50 ml with water, the solution was treated as described in Example 1.

Example 4

815.4 g. of 5,5-diphenyl hydantoin sodium were dissolved with gentle heating in a mixture of 20 g of propylene glycol and 2 g of 2-amino-2(hydroxymethyl)-propane-1,3-diol (tromethamol) as well as 20 g of water. The solution was filled up with water to 50 ml, filtered germ-free, filled into ampuls and sterilized in the closed ampuls at 120°C for 20 minutes. Before application, this infusion concentrate can readily be diluted with standard infusion solutions.

Example 5

As stated in Example 4, 815.4 mg. of 5,5-diphenyl hydantoin sodium were dissolved in a mixture of 14 g. of propylene glycol, 6 g of ethanol, 2 g of tromethanol and 20 g of water. After having been filled up with water to 50 ml, the solution was further treated as in Example 4.

Example 6

As described in Example 4, 815.4 mg. of 5,5-diphenyl hydantoin and 0.1 g. of sodium hydroxide were dissolved in a mixture of 14 g. of propylene glycol, 6 g. of ethanol, 2.0 g. of tromethamol and 20 g of water. After having been filled up with water to 50 ml, the solution was further treated as in Example 4.

I claim:

1. Sterilizable infusion concentrate of essentially unlimited stability, which contains 5,5-diphenyl hydantoin sodium and which is capable of dilution with aqueous infusion solution in any ratio and which comprises as solvents either (1) water, (2) 10 to 50 percent (weight/volume) of tetrahydrofurfuryl alcohol polyethylene glycol ether and (3) 35 to 5 percent (weight/volume) of 2-amino-2-(hydroxymethyl)-propane-1,3-diol as a solubilizer for the 5,5-diphenyl sodium or (1) water, (2) 20 to 50 percent (weight/volume) of propylene glycol and (3) 10 to 2 percent (weight/volume) of 2-amino-2-(hydroxymethyl)-propane-1,3-diol as a solubilizer for the 5,5-diphenyl hydantoin sodium.

2. Infusion concentrate according to claim 1, characterized in that it comprises water and 10 to 50 percent (by weight/volume) of tetrahydrofurfuryl alcohol polyethylene glycol ether as solvents and 35 to 5 percent (wt./vol.) of 2-amino-2(hydroxymethyl)-propane-1,3-diol as solubilizer.

3. Infusion concentrate according to claim 2, characterized in that it comprises water and 15 to 25 percent (/vol.) of tetrahydrofurfuryl alcohol polyethylene glycol ether as solvents and 20 to 12 percent (wt./vol.) of 2-amino-2(hydroxymethyl)-propane-1,3-diol as solubilizer.

4. Infusion concentrate according to claim 1, characterized in that it comprises water and 20 to 50 percent (wt./vol.) of propylene glycol as solvents and 10 to 2 percent (wt./vol.) of 2-amino-2(hydroxymethyl)-propane-1,3-diol as solubilizer.

5. Infusion concentrate according to claim 4, characterized in that it comprises water and 30 to 40 percent (wt./vol.) of propylene glycol as solvents and 5 to 2 percent (wt./vol.) of 2-amino-2(hydroxymethyl)-propane-1,3-diol as solubilizer.

6. Infusion concentrate according to claim 5, characterized in that up to 30 percent by weight of the propylene glycol are replaced by ethanol.

7. Infusion concentrate according to claim 8, characterized in that it additionally comprises up to 0.2 percent (wt./vol.) of sodium hydroxide.

8. A process for preparing an infusion concentrate according to claim 1 comprising dissolving 5,5-diphenyl hydantoin sodium with heating in a solvent mixture comprising (1) water, (2) 10 to 50 percent (weight/volume) of tetrahydrofurfuryl alcohol polyethylene glycol ether and (3) 35 to 5 percent (weight/volume) of 2-amino-2-(hydroxymethyl)-propane-1,3-diol or (1) water, (2) 20 to 50 percent (weight/volume) of propylene glycol and (3) 10 to 2 percent (weight/volume) of 2-amino-2-(hydroxymethyl)-propane-1,3-diol, filtering the solution germ free, filling the germ free solution into ampoules and sterilizing the closed ampoules by heating.

* * * * *